United States Patent [19]
Deprez

[11] Patent Number: 4,523,265
[45] Date of Patent: Jun. 11, 1985

[54] PROCESS AND DEVICE FOR ELIMINATING THE DISTURBANCES RELATED TO THE FLUCTUATIONS OF THE LOAD IN CHOPPED POWER SUPPLIES

[75] Inventor: Louis Deprez, Palaiseau, France

[73] Assignee: Compagnie de Signaux et D'Entreprises Electriques, Paris, France

[21] Appl. No.: 509,271

[22] Filed: Jun. 29, 1983

[51] Int. Cl.[3] .......... H02M 3/335

[52] U.S. Cl. .......... 363/21; 323/258; 323/282

[58] Field of Search .......... 363/18–21, 363/79–80, 85–86, 128; 323/258, 282, 286–287, 343, 271–272

[56] References Cited

U.S. PATENT DOCUMENTS 3,518,527 6/1970 Russell .......... 323/282 X
4,031,453 6/1977 Teuling .......... 363/20
4,357,654 11/1982 Ikenoue et al. .......... 323/282 X

FOREIGN PATENT DOCUMENTS 2543445 3/1977 Fed. Rep. of Germany ...... 323/282
68876 5/1980 Japan .......... 323/282

OTHER PUBLICATIONS

G. C. Johari, "Single-Stage TSR with Regulation in Main Switching Transistor and Output Filter Circuit", *IBM Tech. Discl.Bulletin,* vol. 19, No. 6, Nov. 1976, pp. 2130–2131.

G. 1. Mattson et al., "High Frequency Power Supply", *IBM Tech. Discl. Bulletin,* vol. 15, No. 10, Mar. 1973, pp. 3175–3176.

*Primary Examiner*—Peter S. Wong
*Attorney, Agent, or Firm*—Neuman, Williams, Anderson & Olson

[57] ABSTRACT

A process for eliminating the disturbances related to fluctuations of the load in chopped power supplies comprising a magnetic circuit with a primary inductance (Lp) coupled to a secondary inductance (Ls), characterized in that it consists in automatically adapting the value of the secondary inductance (Ls) as a function of the voltage (Us) at the terminals of the load (X), so as to ensure total transfer of the magnetic energy for each period of the chopping frequency.

11 Claims, 8 Drawing Figures

PROCESS AND DEVICE FOR ELIMINATING THE DISTURBANCES RELATED TO THE FLUCTUATIONS OF THE LOAD IN CHOPPED POWER SUPPLIES

The present invention relates to a process and device for eliminating the disturbances related to fluctuations of the load in chopped power supplies comprising a magnetic circuit with a primary inductance coupled to a secondary inductance.

In energy conversion, the magnetic circuits form a type of component often neglected, which leads to saturation of the material, resulting in an incapability of translating a linear flux variation. This causes an enormous increase in current in the chopping means, generally formed by transistors, when the load is variable and when the power is constant or fluctuating little. The result is disturbances in the network and a risk of damaging the chopping means.

The principal aim of the present invention is to remedy these disadvantages and, for this, it provides a process which is essentially characterized in that it consists in automatically adapting the value of the secondary inductance as a function of the voltage at the terminals of the load, so as to provide a total transfer of the magnetic energy for each period of the chopping frequency.

With this arrangement, complete demagnetization of the circuit is obtained at each period of the chopping frequency, which allows the above-mentioned drawbacks to be eliminated.

A device for implementing this process is characterized in that it comprises a number of switching elements, connected in parallel between the load and different intermediate tappings on the secondary inductance, and a voltage threshold control circuit for controlling successively said switching elements as a function of the voltage at the terminals of the load.

In a particular embodiment of the invention, the switching elements are formed by thyristors.

Preferably, the device of the invention also comprises an automatic regulation circuit for compensating the slow variations of the voltage at the terminals of the primary inductance.

This regulation circuit comprises an auxiliary low power magnetic circuit connected in parallel across the main circuit and whose load is constant, the voltage at the terminals of said load being used as voltage for driving the chopping control, so as to ensure a constant transfer of energy despite the fluctuations of the network.

The process of the invention may also be applied advantageously to the case where the primary inductance and the secondary inductance are combined in a single so-called smoothing inductance. There exist in fact numerous structures in which the smoothing function is obtained by means of a cell comprising an inductor and a capacitor. Now, if the output voltage fluctuates very much, the smoothing inductor risks being saturated, which obviously reduces the smoothing efficiency.

In accordance with the invention, the value of the smoothing inductor is automatically adapted as a function of the voltage at the terminals of the load, during the phase of restoration of the magnetic energy.

To this end, a number of switching elements are used, formed advantageously by thyristors, which are connected in parallel between the load and different intermediate tappings of the smoothing inductor in the magnetic energy restoration phase, and a voltage threshold control device for controlling successively said switching elements as a function of the voltage at the terminals of the load.

Several embodiments of the invention are described hereafter by way of examples, with reference to the accompanying drawings in which:

FIG. 1 is a diagram of a chopped power supply in accordance with the invention, for supplying an arc lamp of the flash type;

FIGS. 2*a* to 2*c* show respectively the trend of the primary current, the trend of the secondary current and the trend of the control voltage of the thyristor, for one period of the chopping frequency;

Figure 1:
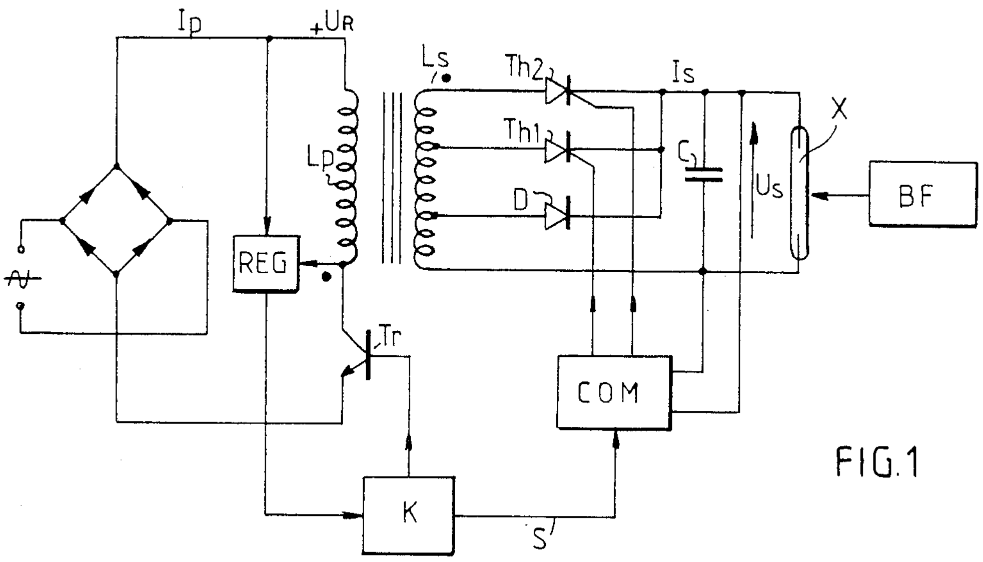

The chopped power-supply shown in FIG. 1 comprises first of all a magnetic circuit with a primary winding which provides a primary inductance Lp coupled to a secondary winding which provides a secondary inductance Ls. In a way known per se, a chopping transistor Tr, controlled by a chopper K, is inserted in the primary circuit. This circuit is fed from the AC network through a diode rectifying bridge, but without any smoothing.

The control pulses generated by chopper K on the base of the chopping transistor Tr are at a high frequency, for example 25 kHz, so as to limit the dimensions of the coils of the magnetic circuit.

Figure 2:
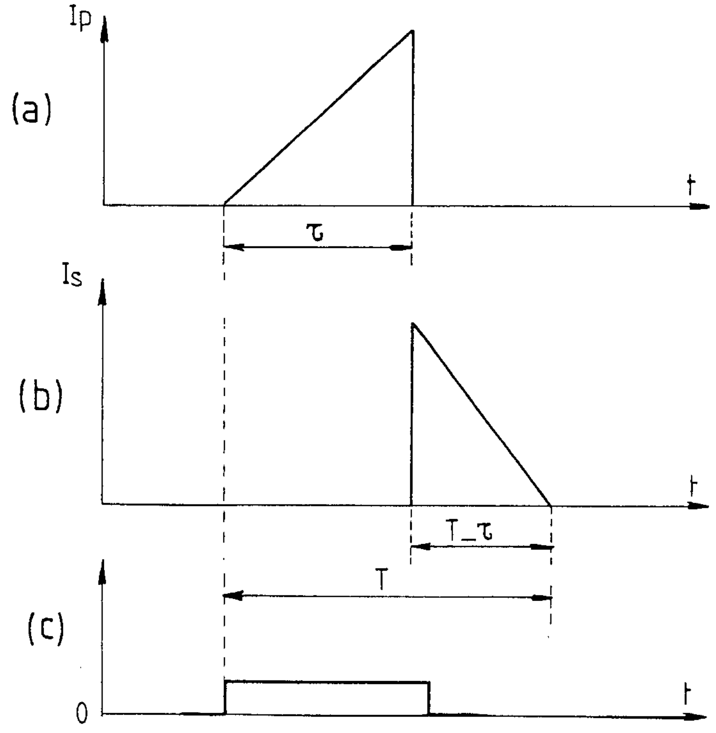

When the transistor is conducting, the primary current Ip has the trend shown in the diagram of FIG. 2*a*. It is a current pulse of duration $\tau$, $\tau$ being the duration of conduction of the transistor. When the transistor is no longer conducting, a current pulse of duration T-$\tau$ is restored at the secondary, T being the period of the chopping frequency. The secondary current Is thus has the trend shown in the diagram of FIG. 2*b*.

In the application envisaged here, the chopped power supply is designed to supply a xenon arc lamp X of the flash type, i.e. a high-speed discharge lamp under recurrent operating conditions. This type of lamp requires, for its operation, a capacitor C of high value to be previously charged during the time interval between each ionization caused on the lamp. Triggering of the lamp is ensured here by a low frequency source BF.

The process of the invention consists in automatically adapting the value of the secondary inductance Ls as a function of the voltage Us at the terminals of the load, which voltage is obviously extremely variable in the case of a flash type lamp, so as to ensure total transfer of the magnetic energy for each period of the chopping frequency and thus to obtain complete demagnetization of the circuit.

The energy transfer per period of the chopping frequency is expressed by:

$$W = \frac{1}{2}\,Lp\,Ip^2 \text{ or } W = \frac{1}{2}\,Ls\,Is^2$$

When the energy is restored at the secondary, the voltage across this latter is imposed during the duration T-$\tau$ by the high time constant of the load. The demagnetization time is then defined by LENZ's law, namely $$Us = \frac{Ls\, Is}{T - \tau}, \text{ whence } Ls = \frac{Us\,(T - \tau)^2}{Is}$$

From the energy transfer relationship, it is deduced that $$Is = \sqrt{\frac{2w}{Ls}}, \text{ whence } Ls = Us^2\,\frac{(T - \tau)^2}{2w}.$$

If we now assume $\tau$ constant, we may assume $$\frac{(T - \tau)^2}{2w} = k = \text{constant},$$

so that finally the following relationship is obtained: $Ls = k\ Us$.

The implementation of the process of the invention consists then in switching the value of the secondary inductance Ls by means of a control device comprising several voltage thresholds staggered with respect to the secondary voltage Us, each threshold causing the control of the value of an inductance capable of satisfying the relationship $Ls = k\ Us^2$. Of course, since it is a question of an inductance jump control, this relationship will be maintained at a limit value, so as to obtain complete demagnetization of the circuit.

To this end, a certain number of taps are provided on the winding which provides the secondary inductance Ls. Such taps are connected to the load through unidirectional power switching elements only able to admit current when the chopping transistor Tr is no longer conducting, i.e. during the magnetic energy restoration phase.

In the particular embodiment described here, the switching elements are three in number. The first two are formed by thyristors $Th_1$ and $Th_2$, whereas the third one is formed by a simple diode D. The gates of the two thyristors are connected to a voltage threshold control device COM, responsive to the output voltage Us at the terminals of the lamp X.

For a low value of the output voltage Us, only the diode D is operative and ensures demangetization of the circuit in the time $(T-\tau)$. Then, for a higher value of the voltage Us, thyristor $Th_1$ is triggered by means of a voltage pulse generated on its gate by the threshold device COM. This pulse has the trend shown in the diagram of FIG. 2*c* and it is synchronized with the chopping frequency, through a synchronizing connection S provided between the chopper K and the threshold device COM. It will be noted that when thyristor $Th_1$ is conducting, diode D is automatically subjected to a reverse potential which no longer allows it to conduct.

For a still higher value of the voltage Us, thyristor $Th_2$ is triggered by the threshold device COM. The diode D and thyristor $Th_1$ are then reversely biassed and can no longer conduct, even if the gate control is maintained on $Th_1$, this being the direct consequence of the distribution of the potentials at the terminals of the secondary inductance.

The strict application of demagnetization process of the invention allows the primary inductance Lp to take energy, at each pulse, proportional to the voltage of the network, without a main control loop. It is a question of instantaneous energy self-modulation related to the sinusoidal voltage of the supply network, and this despite the very large variation of the voltage at the terminals of the load, which may be easily a ratio of ten.

Figure 3:
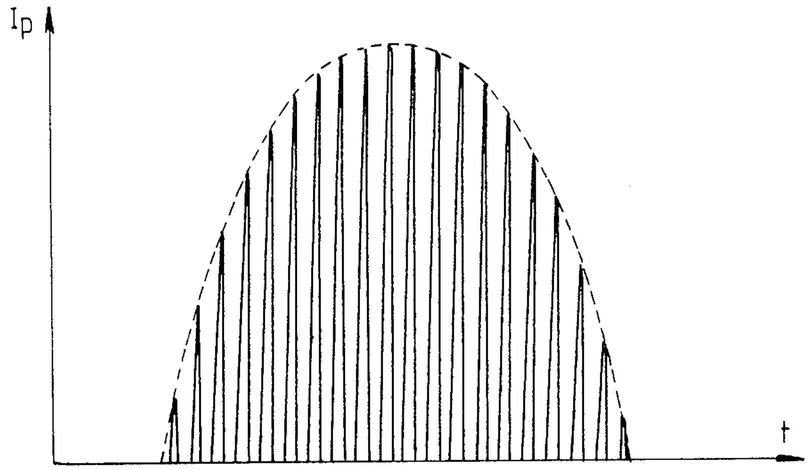
FIG. 3 shows the trend of the primary current with a sinusoidal supply voltage.

Consequently, the energy distribution network is not damaged, the current being taken from this latter according to a sinusoidal law and in phase with the voltage of the network, as illustrated by the diagram of FIG. 3.

Figure 4:
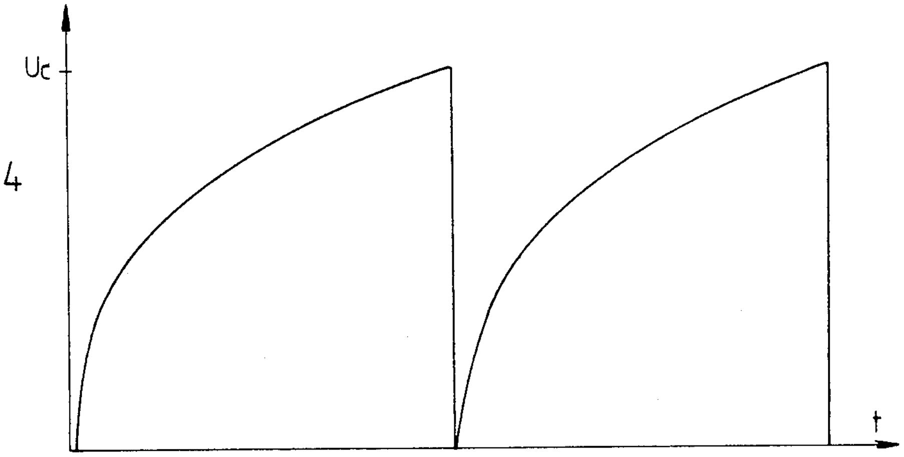
FIG. 4 shows the trend of the charging voltage of the energy storage capacitor.

Similarly, the power taken from the network is constant, the load on capacitor C responding to this condition since it is of the form $Uc = \sqrt{t}$, as illustrated by the diagram of FIG. 4. The envelope of the sinusoidal current is then constant.

However, it often happens that the network is not perfect. In this case, and so as to overcome the slow variations of the mains, a regulation circuit REG may be provided for obtaining information proportional to the energy transferred across the load.

Figure 5:
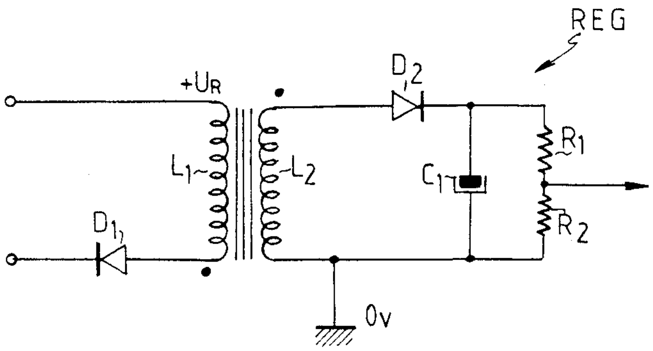
FIG. 5 is the diagram of the regulation circuit for compensating the slow variations of the supply voltage.

This circuit REG is shown in detail in FIG. 5 and is formed essentially of a low power magnetic circuit comprising a primary inductance $L_1$ coupled to a secondary inductance $L_2$. The inductance $L_1$ is connected in parallel across the primary inductance Lp of the main magnetic circuit through a diode $D_1$, whereas the inductance $L_2$ is connected across a constant load formed of two resistors $R_1$ and $R_2$, through a diode $D_2$ and a capacitor $C_1$.

Thus, the same chopping transistor Tr controls the two magnetic circuits, the purpose of diode $D_1$ being to make the restoration of energy of the auxiliary magnetic circuit $L_1/L_2$ independent of the charge state of capacitor C intended to supply the flash lamp X with power.

Figure 6:
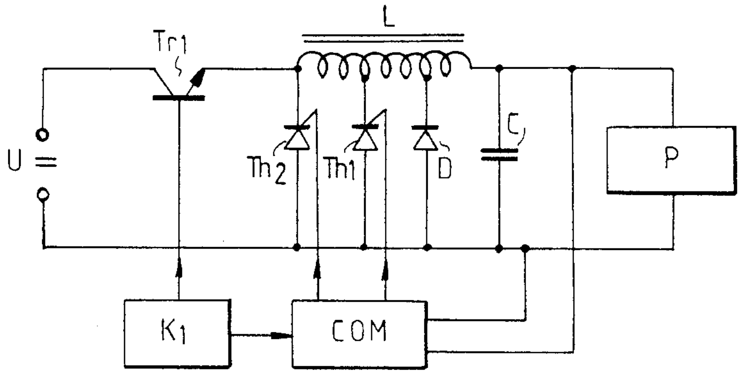
FIG. 6 is the diagram of another application of the invention to the smoothing function.

Inductance $L_2$ restores its energy accumulated during the time $(T-\tau)$ through diode $D_2$ and the integrator $C_1, R_1+R_2$. Since the load $R_1+R_2$ is constant, the voltage at the terminals of $R_2$ is the image of the mean voltage Ur from the main rectification for $\tau$ constant. This voltage at the terminals of $R_2$ is then applied to the feedback circuit of chopper K so as to modify the time $\tau$ as a function of the fluctuations of the mains and thus to ensure a constant energy transfer to capacitor C. Consequently, this latter will always be charged to the same value at the time preceding the discharge. The demagnetization process of the invention may also be applied advantageously to the smoothing function. There exist in fact numerous structures in which the smoothing function is obtained by means of a cell comprising an inductance L and a capacitor C, as in the example shown in FIG. 6.

In this application, the function of the smoothing inductance L is dual. The same winding serves for limiting the current in the conducting phase of the chopping transistor Tr, controlled by chopper $K_1$, then restores its energy when this latter is disabled.

Now, for the applications where the output voltage at the terminals of load P is very fluctuating and may more especially be substantially less than the nominal voltage, the smoothing inductance requires a relatively long demagnetization time, which leads it to saturation.

In accordance with the invention, and as in the example described earilier, a diode D and two thyristors $Th_1$ and $Th_2$ controlled by a voltage threshold device COM are connected to intermediate tappings of the smoothing inductance L. The threshold device COM, in relation with the output voltage, adapts the value of the inductance in the restoration phase, so as to maintain a constant demagnetization time. Thus, the inductance does not have to withstand the passage of an excessive DC current component, which risks saturating it, thus allowing the efficiency of the smoothing filter to be maintained despite high current variations.

I claim:

1. A chopped voltage supply comprising: a magnetic circuit, a pair of input terminals, chopping transistor means connecting said input terminals to said magnetic circuit and arranged to operate periodically to build up magnetic energy in said magnetic circuit during an initial portion of each period of operation, said magnetic circuit including a tapped winding for transfer of energy to a load during the remaining portion of each period of operation, said winding having end terminals and a plurality of tap terminals, a pair of load terminals for connection to a load, a connection between one of said winding terminals and one load terminal and a plurality of switch elements connected between others of said winding terminals and the iother load terminal, and a voltage threshold control circuit coupled to said load terminals and coupled to said switch elements for controlling conduction of said switch elements to control the value of the inductance of said winding which is connected in series with the load and to regulate the load voltage.

2. In a chopped voltage supply as defined in claim 1, said switching elements being formed by thyristors.

3. In a chopped voltage supply as defined in claim 1, said magnetic circuit including a primary winding separate from said tapped winding and connected to said chopping transistor means, and an automatic regulation circuit connected to terminals of said primary winding and to said chopping transistor means for compensating for relatively slow variations in the voltage at said primary winding terminals.

4. In a chopped voltage supply as defined in claim 3, said regulation circuit comprising a separate auxiliary low power magnetic circuit having a winding connected in parallel relation to said primary winding, auxiliary load means connected to said auxiliary magnetic circuit to provide a substantially constant load, and means coupling said chopping transistor means to said auxiliary load means for control of said chopping transistor means in response to the voltage of said auxiliary load means.

5. In a chopped voltage supply as defined in claim 1, said chopping transistor means being connected to terminals of said winding to utilize said winding both in building up magnetic energy during said initial portion of each period of operation and in transferring energy to the load during the remaining portion of each cycle of operation.

6. In a chopped voltage supply as defined in claim 5, means connecting said chopping transistor means, said tapped winding and the load in series relation to each other and to provide a series circuit between said input terminals.

7. In a chopped voltage supply as defined in claim 5, said switching elements being formed by thyristors.

8. In a chopped voltage supply as defined in claim 1, said tapped winding terminals including a first terminal connected to said one load terminal, a second terminal connected to one of said switching elements, a third terminal at a tap between said first and second terminals and connected to another of said switching elements, and a fourth terminal at a tap intermediate said third terminal and said first terminal, and a diode connected between said fourth terminal and said other load terminal and arranged to conduct during said remaining portion of a period of operation when said switching elements are so controlled as to be non-conductive.

9. In a chopped voltage supply as defined in claim 8, said magnetic circuit including a primary winding separate from said tapped winding and connected to said chopping transistor means.

10. In a chopped voltage supply as defined in claim 8, one of said input terminals being connected to said other load terminal, and said chopping transistor means being connected between the other input terminal and a winding terminal other than said first terminal thereof.

11. In a method for eliminating disturbances related to load fluctuations in a chopped voltage supply which includes a magnetic circuit with a winding for connection in circuit with a load, the steps of providing a plurality of taps on the winding for connection of the winding in series relation to the load, operating periodically at a certain frequency to build up magnetic energy in said magnetic circuit during an initial portion of each period of operation and to transfer energy from the magnetic circuit to the load through current flow through the winding and load during the remaining portion of each period of operation, sensing changes in the voltage applied to the load from the winding, and switching from one tap to another of the winding as required to change the inductance of the magnetic circuit in series with one load and maintain the load voltage within certain limits and to obtain by the end of each period of operation a substantially total transfer of the magnetic energy to the load and a substantially complete demagnetization of the circuit.

* * * * *